US012626936B2

(12) United States Patent
Heidenreich et al.

(10) Patent No.: US 12,626,936 B2
(45) Date of Patent: May 12, 2026

(54) PRESSURE CONTAINER SYSTEM FOR A MOTOR VEHICLE, MOTOR VEHICLE AND METHOD FOR INTERRUPTING A FLUID CONNECTION

(71) Applicant: Bayerische Motoren Werke Aktiengesellschaft, Munich (DE)

(72) Inventors: Ulrich Heidenreich, Munich (DE); Richard Krueger, Irschenhausen/Icking (DE); Leander Koegl, Vagen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 351 days.

(21) Appl. No.: 15/933,092

(22) Filed: Mar. 22, 2018

(65) Prior Publication Data
US 2018/0208052 A1 Jul. 26, 2018

Related U.S. Application Data

(63) Continuation of application No. PCT/EP2016/069139, filed on Aug. 11, 2016.

(30) Foreign Application Priority Data

Sep. 23, 2015 (DE) ..................... 10 2015 218 233.9

(51) Int. Cl.
*H01M 8/04* (2016.01)
*B60K 15/03* (2006.01)
(Continued)

(52) U.S. Cl.
CPC ... *H01M 8/04201* (2013.01); *B60K 15/03006* (2013.01); *F17C 13/12* (2013.01);
(Continued)

(58) Field of Classification Search
None
See application file for complete search history.

(56) References Cited

U.S. PATENT DOCUMENTS 5,915,666 A * 6/1999 Hayashi .............. F15B 13/0817
137/884
6,041,762 A 3/2000 Sirosh et al.
(Continued)

FOREIGN PATENT DOCUMENTS

CA 2 860 682 A1 10/2014
DE 103 44 608 A1 5/2004
(Continued)

OTHER PUBLICATIONS

Solenoid Valve Definition, 2025.*
(Continued)

*Primary Examiner* — Jonathan G Leong
*Assistant Examiner* — Tony S Chuo
(74) *Attorney, Agent, or Firm* — Crowell & Moring LLP

(57) ABSTRACT

A pressurized container system for a motor vehicle includes a pressurized container configured to store a fuel, wherein the pressurized container system has a shut-off valve which is configured to interrupt, in a currentless state, a fluid connection between the pressurized container and at least one fuel gas consumer. A safety switch is configured to interrupt a power supply to the shut-off valve, where the safety switch is not an ignition switch of the motor vehicle.

3 Claims, 1 Drawing Sheet

(51) Int. Cl.

| | |
|---|---|
| *F17C 13/12* | (2006.01) |
| *H01M 8/04082* | (2016.01) |
| *H01M 8/04746* | (2016.01) |

(52) U.S. Cl.

CPC ................... *H01M 8/04753* (2013.01); *B60K 2015/03013* (2013.01); *B60K 2015/03019* (2013.01); *B60K 2015/03026* (2013.01); *B60K 2015/03256* (2013.01); *B60K 2015/03315* (2013.01); *B60K 2015/03375* (2013.01); *F17C 2201/056* (2013.01); *F17C 2201/058* (2013.01); *F17C 2205/0326* (2013.01); *F17C 2205/0394* (2013.01); *F17C 2221/012* (2013.01); *F17C 2221/033* (2013.01); *F17C 2221/035* (2013.01); *F17C 2223/0123* (2013.01); *F17C 2223/0161* (2013.01); *F17C 2223/033* (2013.01); *F17C 2223/036* (2013.01); *F17C 2260/028* (2013.01); *F17C 2260/042* (2013.01); *F17C 2265/066* (2013.01); *F17C 2270/0178* (2013.01); *F17C 2270/0184* (2013.01); *H01M 2250/20* (2013.01); *Y02E 60/32* (2013.01); *Y02T 90/40* (2013.01)

(56) References Cited

U.S. PATENT DOCUMENTS

| | | | |
|---|---|---|---|
| 6,390,075 B1 | 5/2002 | Yamazaki et al. | |
| 6,424,253 B1 * | 7/2002 | Shen ..................... | B60R 25/042 340/428 |
| 8,153,314 B2 | 4/2012 | Umayahara et al. | |
| 8,815,423 B2 | 8/2014 | Yoshida et al. | |

| | | | |
|---|---|---|---|
| 2004/0005487 A1 * | 1/2004 | Matoba ............. | H01M 8/04302 429/413 |
| 2009/0078238 A1 * | 3/2009 | Ueda .................. | F02M 25/0836 123/520 |
| 2010/0143757 A1 * | 6/2010 | Takagi ............. | H01M 8/04223 429/429 |
| 2012/0148926 A1 * | 6/2012 | Betts ................. | H01M 8/04171 429/414 |

FOREIGN PATENT DOCUMENTS

| | | | |
|---|---|---|---|
| DE | 10 2006 034 547 A1 | 2/2007 | |
| DE | 10 2005 054 894 A1 | 5/2007 | |
| DE | 11 2010 001 900 T5 | 6/2012 | |
| DE | 10 2013 112 534 A1 | 6/2014 | |
| DE | 10 2013 212 969 A1 | 1/2015 | |
| DE | 11 2013 001 899 T5 | 1/2015 | |
| DE | 11 2010 004 075 B4 | 7/2015 | |
| DE | 10 2014 001 375 A1 | 8/2015 | |
| EP | 1 664 617 B1 | 2/2011 | |
| EP | 2 777 969 A1 | 9/2014 | |
| KR | 10-2005-0042662 * | 5/2005 | .............. H01M 8/04 |

OTHER PUBLICATIONS

PCT/EP2016/069139, International Search Report dated Nov. 2, 2016 (Three (3) pages).

German Search Report Issued in German counterpart application No. 10 2015 218 233.9 dated Jul. 26, 2016, with Statement of Relevancy (Twelve (12) pages).

ECE/TRANS/WP.29/GRSP/2014/8 "Proposal by European Commission and OICA of Draft Regulation on hydrogen and fuel cell vehicles", 551th GRSP, May 19-25, 2014, two total pages.

* cited by examiner

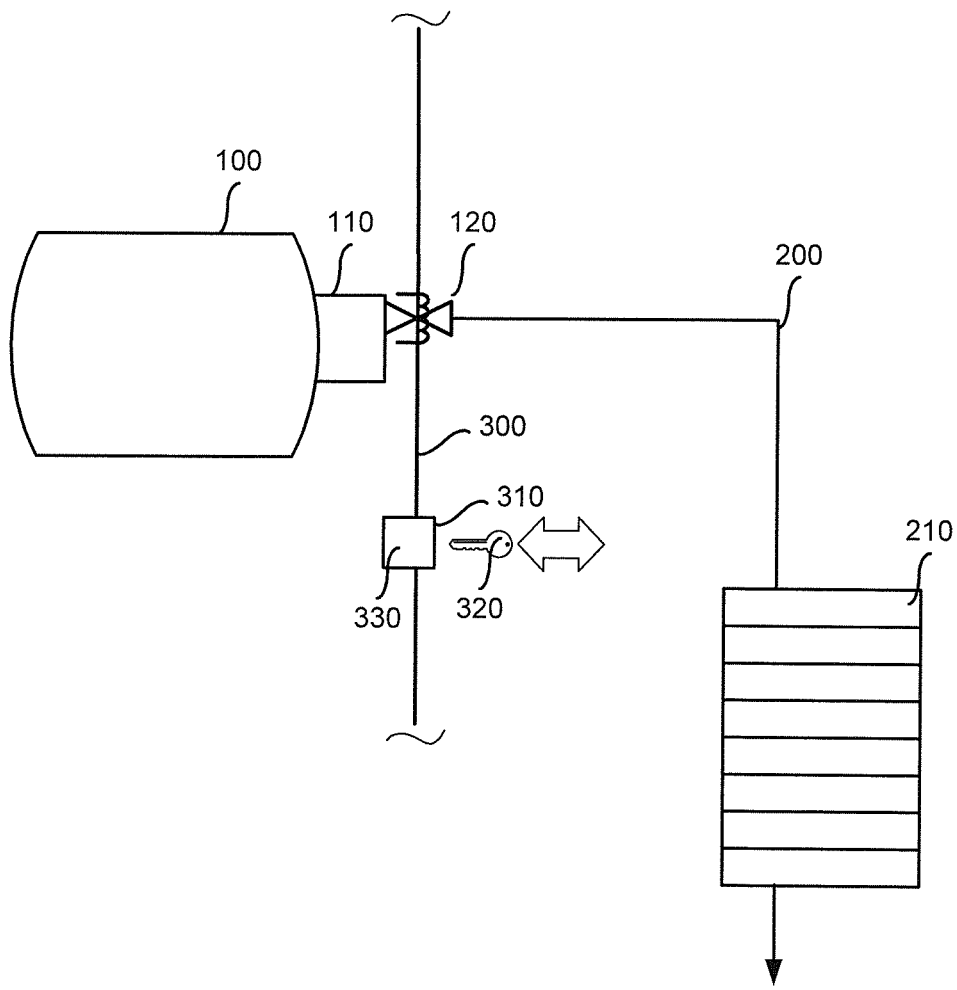

PRESSURE CONTAINER SYSTEM FOR A MOTOR VEHICLE, MOTOR VEHICLE AND METHOD FOR INTERRUPTING A FLUID CONNECTION

CROSS REFERENCE TO RELATED APPLICATIONS

This application is a continuation of PCT International Application No. PCT/EP2016/069139, filed Aug. 11, 2016, which claims priority under 35 U.S.C. § 119 from German Patent Application No. 10 2015 218 233.9, filed Sep. 23, 2015, the entire disclosures of which are herein expressly incorporated by reference.

BACKGROUND AND SUMMARY OF THE INVENTION

The technology disclosed here relates to a motor vehicle having a fuel cell system and having a pressurized container system, a pressurized container system for a motor vehicle and a method for interrupting a fluid connection. Motor vehicles having a fuel cell system as such are known and are also referred to as fuel cell electrical vehicles (FCEVs). In such systems, fuel gases, e.g. hydrogen, are used which can easily be ignited. At present, there is no possible way of closing the fuel cell system in the trade organization (i.e. the workshops, logistics, display facilities, etc.). In previously known solutions, the fuel-gas-conducting anode subsystem is disconnected only if the ignition of the motor vehicle is switched off. For example, in the proposed standard ECE/TRANS/WP.29/2014/78 "Proposal for a new Regulation on hydrogen and fuel cell vehicles (HFCV)" of 2014 it is stated that in the currentless state the shut-off valves are intended to interrupt the fluid connection between the pressurized container and any supply lines (i.e. "normally closed valve"). Documents U.S. Pat. No. 6,390,075 B1, U.S. Pat. No. 6,041,762 A and EP 1 664 617 A2 present previously known prior art.

If, for example during a repair, the anode subsystem is removed, there can theoretically be the risk of a fitter or a further employee (inadvertently) switching on the ignition and therefore opening the shut-off valve. If no further protective measures such as, for example, an overflow valve (also referred to as an "excess flow valve") are provided, the fuel gas which is stored with very high pressure could very quickly escape and cause serious damage.

Following an accident there can also be situations in which the rescue forces would like to cap the fluid connection to the pressurized tank.

An object of the technology disclosed here is to reduce or overcome the disadvantages of the previously known solutions. Further objects arise from the advantageous effects of the technology disclosed here.

The technology disclosed here relates to a pressurized container system for a motor vehicle. This can be a high-pressure gas container system or a cryogenic pressurized container system. High-pressure gas container systems are designed to store fuel at ambient temperatures permanently at a pressure above approximately 350 bar, also preferably above approximately 500 bar and particularly preferably above approximately 700 bar. Cryogenic pressurized container systems comprise a cryogenic pressurized container. The pressurized container can be used in a motor vehicle which is operated, for example, with compressed natural gas (CNG) or liquefied natural gas (LNG). The cryogenic pressurized container can store fuel in the liquid or supercritical aggregate state. The fuel can be, for example, hydrogen which is stored at temperatures of approximately 30 K to 360 K in the cryogenic pressurized container. The cryogenic pressurized container can comprise, in particular, an internal container which is configured for storage pressures up to approximately 1200 bar, preferably up to approximately 875 bar and particularly preferably up to approximately 350 bar. The cryogenic pressurized container preferably comprises a vacuum with an absolute pressure in the range from $10^{-9}$ mbar to $10^{-1}$ mbar, also preferably from $10^{-7}$ mbar to $10^{-3}$ mbar and particularly preferably of approximately $10^{-5}$ mbar.

The pressurized container has a shut-off valve. This shut-off valve is preferably arranged directly on the opening of the pressurized container or directly adjacent to the opening. The shut-off valve is designed to interrupt, in the currentless state, the fluid connection between the pressurized container and a fuel gas consumer, preferably all the fuel gas consumers. The shut-off valve is therefore a valve which assumes a closed position as a default position when the shut-off valve is not connected to a power supply.

The technology disclosed here also comprises at least one safety valve, wherein the safety valve is designed to interrupt the power supply to the shut-off valve. In other words, the safety switch is a switch which can interrupt the power supply of the shut-off valve. The safety switch is expediently an electrical switch which is as a rule connected to the electrical terminals of the shut-off valve. However, this switch is not the ignition switch which is activated, for example, in order to put the motor vehicle into operation or shut it down. The safety switch can be provided in addition to the ignition switch. The safety isolator switch advantageously does not have any other function than disconnection of the power supply to the shut-off valve. The safety isolator switch expediently interrupts only the power supply to the fuel cell system, particularly preferably only to the shut-off valve. Other circuits are preferably therefore not interrupted. An ignition switch is provided as a rule for this function.

An ignition switch is here as a rule a switch which can interrupt and release the electrical circuits of the motor vehicle which are used during the driving mode of the motor vehicle and/or during the pre-conditioning for the driving mode. For example, in a switch position of the ignition switch, said ignition switch supplies electrical current to the on-board power system electronics and secondary consumers such as the car radio and the ventilation system. The ignition switch can be locked and/or unlocked by mechanical or electronic ignition switches. Such an ignition switch can also be activated inadvertently or intentionally during maintenance operations.

The safety switch preferably comprises a safety mechanism. The safety mechanism can be designed in such a way that, after the interruption of the power supply, the power supply is permitted again only after authorization. The authorization can be ensured, for example, by means of a key, a numerical code or by other measures. In one preferred embodiment, the safety switch comprises a lock which permits locking of the circuit with respect to the shut-off valve only if the lock is not locked. In other words, after the interruption of the power supply to the shut-off valve, the safety switch can be locked or secured. In the locked state, the safety switch can then no longer be activated. A fitter or a further employee then cannot activate the safety switch (inadvertently). After the conclusion of the repair, the safety switch can be unlocked/released again, for example by means of a corresponding key.

The safety switch is preferably accessible for maintenance operations and/or recovery operations without removing of further operating components. Operating components are here functional components which necessarily have to be mounted for the motor vehicle to operate, such as, for example, components of the fuel cell system or of the pressurized container system, but not any covers and/or paneling elements. In the case of an accident or repair, the safety switch is preferably accessible without further tools, preferably from the outside, in particular from outside the bodywork.

The technology disclosed here also relates to a motor vehicle having at least one pressurized container system which is disclosed here and having at least one fuel cell system which is fluidically connected to the pressurized container system, wherein the shut-off valve which is disclosed here is designed to interrupt the fluid connection.

The fuel cell system is intended, for example, for mobile applications such as motor vehicles, for example as an energy supplier for a drive machine. In its simplest form, a fuel cell is an electrochemical energy converter which converts fuel and oxidizing agent into reaction products and in the process produces electricity and heat. The fuel cell comprises an anode and a cathode which are separated by an ion-selective separator. The anode has a supply for a fuel to the anode. Preferred fuels are: hydrogen, low-molecular alcohol, biofuels or liquefied natural gas. The cathode has, for example, a supply for oxidizing agent. Preferred oxidizing agents are, for example, air, oxygen and peroxides. The ion-selective separator can be embodied, for example, as a proton exchange membrane (PEM). A cation-selective polymer electrolyte membrane is preferably used. Materials for such a membrane are, for example: Nafion®, Flemion® and Aciplex®. A fuel cell system comprises at least one fuel cell and peripheral system components (BOP components) which can be used during the operation of the at least one fuel cell. As a rule, a plurality of fuel cells is combined to form a fuel cell stack.

The technology disclosed here also relates to a method for interrupting a fluid connection between at least one pressurized container for storing a fuel and at least one fuel cell system of a motor vehicle. It comprises the steps:

interrupting the power supply to the shut-off valve disclosed here, wherein the shut-off valve is designed to prevent, in the currentless state, the fluid connection between the pressurized container and the fuel cell system; and securing the interruption of the power supply or of the safety switch against unauthorized or unintentional restoration of the power supply.

The method preferably comprises the step according to which the interruption of the power supply is secured by means of a lock. The method preferably comprises the step according to which, before the start of servicing operations on the motor vehicle, in particular before an intervention into an anode subsystem of the fuel cell system, the power supply is interrupted and/or the interruption or the safety switch is secured. The method preferably comprises the step according to which after the conclusion of a on the motor vehicle, in particular an intervention into an anode subsystem of the fuel cell system, the power supply is permitted again and/or the interruption or the safety switch is released. The anode subsystem preferably comprises here all the fuel-gas-conducting components.

Such a safety switch can advantageously be embodied separately from a high-voltage safety switch (also referred to as "high-voltage service disconnect switch"), which can interrupt at least one high-voltage circuit in the motor vehicle.

Servicing operations on a motor vehicle comprise, for example, the repair, the exchange of components/parts, the recovery of the vehicle, if appropriate including transportation, as well as the maintenance and monitoring. The technology disclosed here is a possible way of deactivating the fuel supply. The deactivation may be necessary in order to move into an area (e.g. enclosed space, for example workshop) which does not have fuel certification (e.g. hydrogen certification) or fuel approval (also e.g. enclosed transportation on trucks, parking areas or display areas). The technology disclosed here can constitute an additional means of securing a motor vehicle which has been damaged or involved in an accident, in particular motor vehicles whose status is unclear.

The technology disclosed here relates, in other words, to the introduction of a fuel disconnect switch, in particular a hydrogen recovery disconnect switch. The shut-off valve, the safety switch and/or the cut-off point can be secured against re-activation with a lock or by some other precautionary means. This would come into play in the case of maintenance/repair as well as after an accident.

In individual cases it may be beneficial to be able to deactivate the fuel-conducting system separately from the high-voltage system, e.g. if a vehicle has to be moved into areas in which, for example, hydrogen operation is not permitted or if e.g. there is a leak in the anode subsystem.

Other objects, advantages and novel features of the present invention will become apparent from the following detailed description of one or more preferred embodiments when considered in conjunction with the accompanying drawings.

BRIEF DESCRIPTION OF THE DRAWINGS

A preferred exemplary embodiment of the invention is described below with reference to the appended drawing. This results in further details, preferred refinements and developments of the invention.

The Figure depicts one embodiment of a pressured container system.

DETAILED DESCRIPTION OF THE DRAWING

The technology disclosed here will now be explained with reference to the Figure. The Figure shows the pressurized container system disclosed here. It is connected here to a fuel cell stack 210 of a fuel cell system. Further components of the fuel cell system and of the pressurized container system have been omitted for the sake of simplicity. The shut-off valve 120 is provided directly at the end 110 of the pressurized container 100 here. A shut- off valve 120 is an electrically activated valve. The current flows to the shut-off valve 120 via the circuit 300 (not illustrated completely). The shut-off valve 120 is opened as long as a current flows through the coils of the shut-off valve 120. If the circuit is then interrupted, for example by activating the ignition key (not illustrated), the shut-off valve 120 closes. This occurs when the motor vehicle is shut down after operation. In addition, a safety switch 310 is provided here which can additionally interrupt the power supply to the magnet of the shut-off valve 120 via the circuit 300 here. This safety switch 310 can be activated independently of other statuses and parameters of the motor vehicle. If the safety switch 310 interrupts the power supply, a situation is reliably avoided in which the shut-off valve 120 opens and the pressurized gas flows out. In addition, such a safety switch 310 could also reduce the risk of other fault sources, for example short-circuits or incorrect outputs from the controller, in particular if the safety switch 310 is arranged adjacent to the shut-off valve 120. In the advantageous embodiment shown here, a lock 330 is also integrated into the safety switch 310, which lock 330 is locked by means of a key 320. If the safety switch 310 is locked, it is ensured here that another employee cannot close the circuit again by activating the safety switch 310 before the servicing operations on the motor vehicle are concluded. If the operations are concluded, the responsible fitter can release the lock again and close the safety switch 310.

The motor vehicle can then be operated normally. The ignition key expediently differs from the key 320 which is installed in the motor vehicle. The key 320 particularly preferably differs generally from ignition keys installed in motor vehicles.

The above description of the present invention serves only for illustrative purposes and not for the purpose of limiting the invention. Various changes and modifications are possible within the scope of the invention without departing from the scope of the invention and its equivalents.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressurized container system of a motor vehicle, comprising:

a pressurized container configured to store a fuel, wherein the pressurized container system has a shut-off valve which is configured to interrupt, in a currentless state, a fluid connection between the pressurized container and at least one fuel gas consumer; and a safety switch configured to interrupt a power supply to the shut-off valve for performing a servicing operation on the motor vehicle, wherein the safety switch is an electrical switch which is connected to electrical terminals of the shut-off valve, wherein the safety switch and an ignition switch of the motor vehicle are configured to independently interrupt the power supply to the shut-off valve, and wherein the safety switch interrupts only the power supply to the shut-off valve for performing the servicing operation;

wherein a lock is integrated into the safety switch, wherein after an interruption of the power supply by the safety switch the safety switch is lockable by locking the lock with a key, and wherein the safety switch permits the power supply again only after the lock is unlocked by the key.

2. The pressurized container system as claimed in claim 1, wherein the safety switch is accessible without removing further operating components.

3. A motor vehicle, comprising:

a pressurized container system, wherein the pressurized container system has a pressurized container configured to store a fuel, wherein the pressurized container system has a shut-off valve which is configured to interrupt, in a currentless state, a fluid connection between the pressurized container and at least one fuel gas consumer; and at least one fuel cell system which is fluidically connected to the pressurized container system, wherein the shut-off valve is designed to interrupt the fluid connection;

wherein the pressurized container system has a safety switch configured to interrupt a power supply to the shut-off valve, wherein the safety switch is an electrical switch which is connected to electrical terminals of the shut-off valve, wherein the safety switch and an ignition switch of the motor vehicle are configured to independently interrupt the power supply to the shut-off valve, wherein the safety switch interrupts only the power supply to the shut-off valve, wherein the safety switch interrupts the power supply to the shut-off valve before an intervention into an anode subsystem of the at least one fuel cell system, wherein a lock is integrated into the safety switch, wherein after an interruption of the power supply by the safety switch the safety switch is lockable by locking the lock with a key, and wherein the safety switch permits the power supply again only after the lock is unlocked by the key.

* * * * *